Patented Oct. 10, 1922.

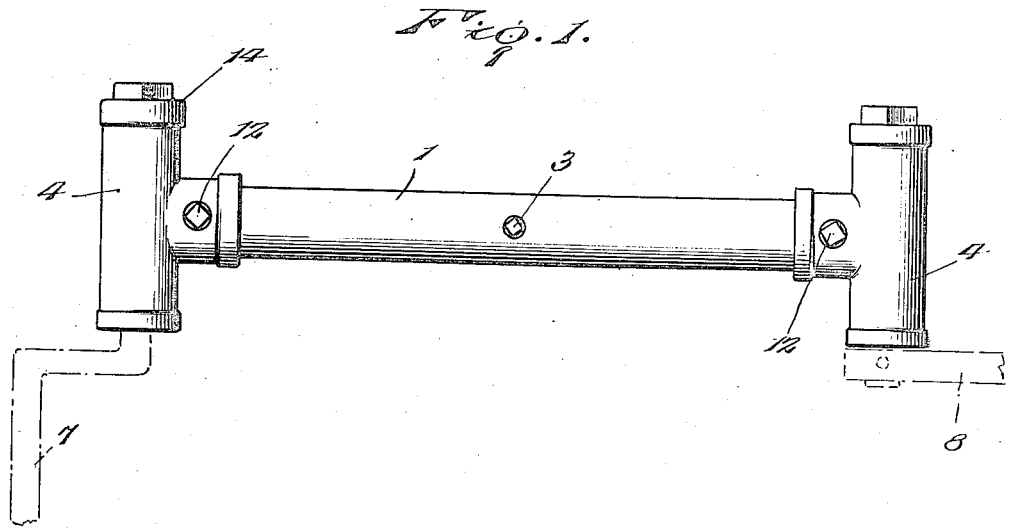
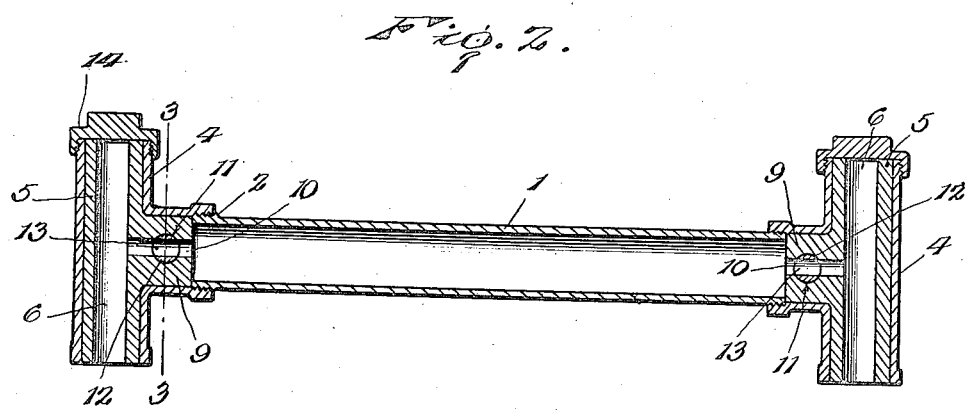
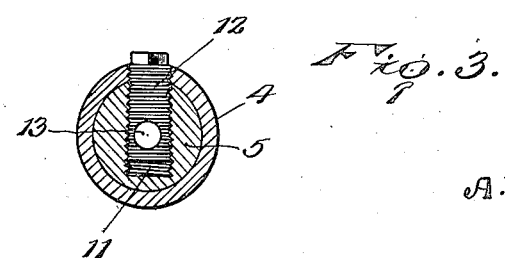

1,431,222

UNITED STATES PATENT OFFICE.

ALEXANDER W. FIELD, OF GLEICHEN, ALBERTA, CANADA.

LUBRICATING PITMAN.

Application filed December 9, 1921. Serial No. 521,207.

*To all whom it may concern:*

Be it known that I, ALEXANDER W. FIELD, a citizen of the United States, residing at Gleichen, in the Province of Alberta and Dominion of Canada, have invented certain new and useful Improvements in Lubricating Pitmen, of which the following is a specification.

This invention has for its object the provision of a pitman so constructed that it may carry a supply of oil which may flow readily to the bearings at the ends of the pitman to lubricate the connecting parts. The invention also provides means for regulating the flow of the oil from the pitman reservoir to the bearings. The invention is illustrated in the accompanying drawings and resides in certain novel features which will be hereinafter particularly set forth.

In the drawings—

Figure 1 is a plan view of a pitman embodying my present invention;

Fig. 2 is a horizontal section of the same;

Fig. 3 is a transverse section on the line 3—3 of Fig. 2.

The pitman bar or shank 1 is constructed of tubing externally threaded at its ends, as shown at 2, and provided at a point intermediate its ends with a filling opening normally closed by a plug 3. The bearing heads 4 are preferably T-couplings or elbows having their offsets engaged with the threaded extremities of the shank or bar, as clearly shown in Fig. 2. In carrying out the invention, the bearings or heads 4 are lined with Babbitt metal, indicated at 5, and passages 6 are formed through the lining to accommodate the parts to be connected by the pitman, Fig. 1 of the present drawings indicating a driving crank 7 and a cutter head connection 8 as engaged with the respective pitman heads. While I have thus indicated the use of the device in a harvester or mower, it is to be understood that it may be used in any other connection where a pitman is usually employed to convert rotary motion into reciprocatory motion. The lining 5 of the bearing heads 4 will, of course, extend into the offsets of said heads, as shown at 9, and passages or bores 10 are formed therethrough to establish communication between the pitman bar or shank 1 and the respective bearing heads. I also form intersecting bores 11 within the offsets of the bearing heads and the lining for the same and in the said bores or passages I mount screw plug valves 12 having ports 13 formed diametrically therethrough near their inner ends, the ports 13 being approximately equal in diameter to the bores or passages 10 and adapted to aline therewith, as will be readily understood. The bearing head which receives the working end of the crank 7 is equipped with a dust cap 14 to prevent the entrance of sand or other matter to the bearing and for the same purpose washers of well-known type may be provided around the pin by which the opposite bearing head is connected with the fork or other elements connecting said head with the driven part.

When the pitman has been connected with the driving and driven elements and before it is used oil is poured through the opening 3 into the pitman bore or shank so as to fill the same, the screw plug valves 12 being turned so that the ports 13 thereof will extend across the bores 10 and flow of the oil to the bearings will be prevented. When the device is to be used, the valves 12 are turned to the open position so that the oil will flow to the bearings and lubricate the same and obviously the flow of the oil may be regulated as desired by turning the valve to a greater or less degree so that the port of the same will be more or less out of complete alinement with the bores or passages 10. My device is exceedingly simple in the construction and arrangement of its parts and may be readily produced and applied at a very low cost. Inasmuch as lubrication is accomplished automatically as desired, the parts to which the pitman is applied will operate smoothly for a long period without requiring attention from the user. The linings 5 may, of course, be brass but will preferably be of Babbitt metal as new linings may be then fitted in place as needed without requiring skilled labor.

Having thus described the invention, what is claimed as new is:

1. A pitman comprising a tubular shank constructed to permit the feeding of lubricant thereinto, tubular bearing heads secured to the ends of said shank and communicating therewith, and screw plug valves in the bearings having ports through their lower ends to control the flow of lubricant from the shank to the bearings.

2. A pitman comprising a tubular shank, bearing heads secured to the ends of the said shank and communicating therewith, means to permit the filling of the shank with a lubricant, linings in the bearing heads having intersecting openings therethrough, some of said openings communicating with the tubular shank, and screw plug valves fitted in the said linings and the bearings and having ports through their lower ends whereby to control the flow of lubricant from the shank to the bearing heads.

In testimony whereof I affix my signature.

ALEXANDER W. FIELD. [L. S.]